F. W. MEYER.
ELECTROIONIC SYSTEM OF CONTROL AND REGULATION.
APPLICATION FILED MAR. 22, 1919.
1,369,457.
Patented Feb. 22, 1921.
2 SHEETS—SHEET 1.
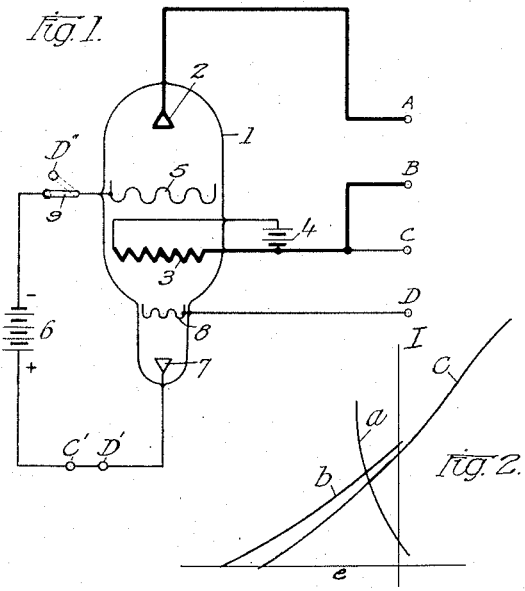
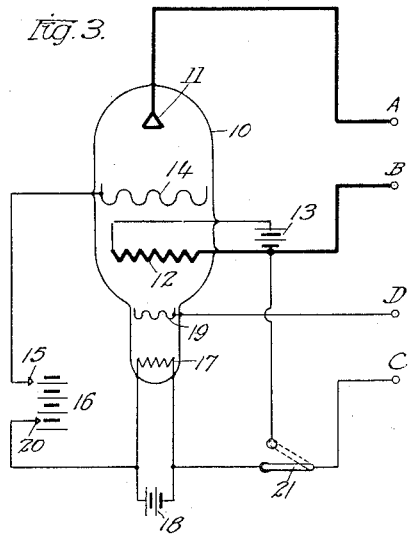
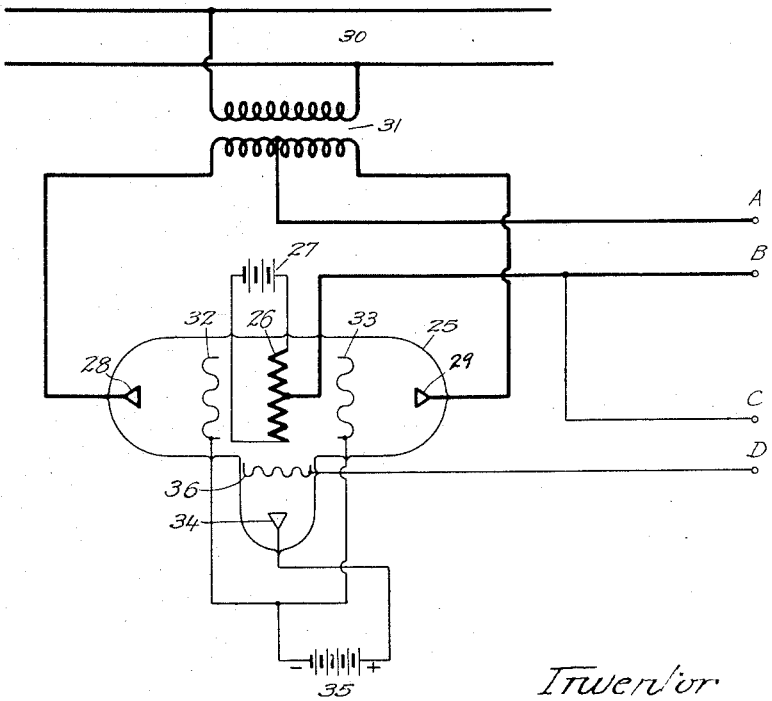
Inventor
Friedrich W. Meyer
By: Edwin B H Towers
Atty.

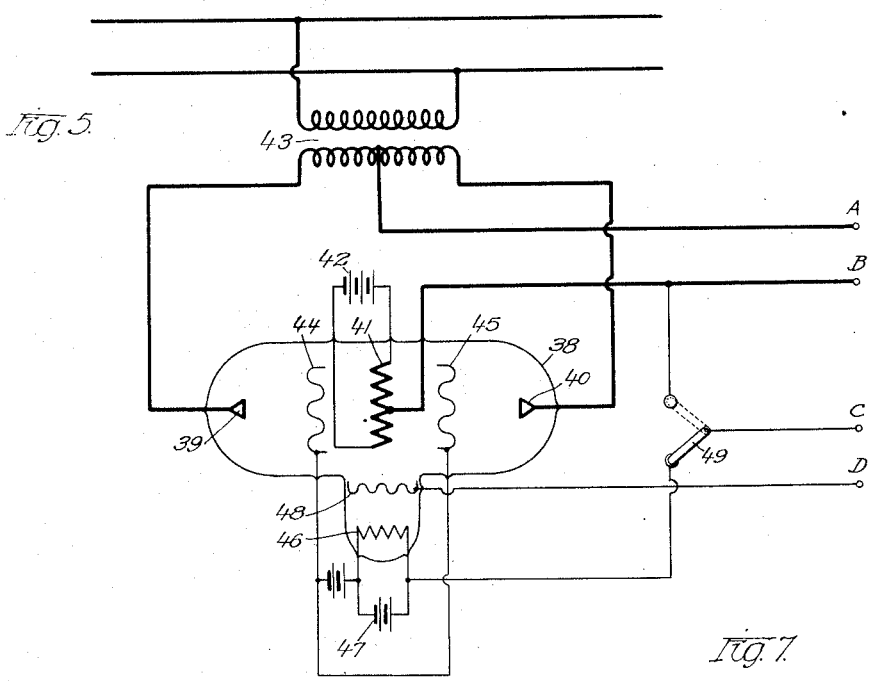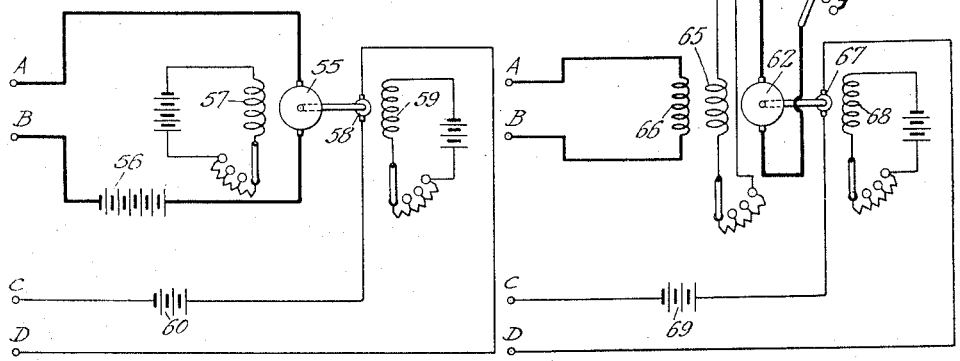

UNITED STATES PATENT OFFICE.

FRIEDRICH WILHELM MEYER, OF MILWAUKEE, WISCONSIN, ASSIGNOR TO THE CUTLER-HAMMER M'F'G CO., OF MILWAUKEE, WISCONSIN, A CORPORATION OF WISCONSIN.

ELECTROIONIC SYSTEM OF CONTROL AND REGULATION.

1,369,457. Specification of Letters Patent. Patented Feb. 22, 1921.

Application filed March 22, 1919. Serial No. 284,249.

*To all whom it may concern:*

Be it known that I, FRIEDRICH WILHELM MEYER, a citizen of the German Empire, residing at Milwaukee, in the county of Milwaukee and State of Wisconsin, have invented new and useful Improvements in Electroionic Systems of Control and Regulation, of which the following is a specification.

This invention relates to electroionic systems of control and regulation.

One of the objects of this invention is to provide an electroionic system of control and regulation wherein the relay effects of the usual series or cascade arrangement of several electroionic valves may be obtained by employing a single electroionic valve.

Another object is to provide an electroionic system of regulation and control of dynamo electric machines wherein the electroionic valve is simple in construction, efficient and reliable in operation and self-intensifying in effect.

A further object is to provide an electroionic system of control and regulation wherein the high voltage conductors carrying the larger currents are effectively separated and insulated from the low voltage regulating or controlling circuits carrying small or practically no currents.

Other objects and advantages of the invention will appear from the description and claims.

The electroionic valve *per se* forms the subject matter of my copending divisional application Serial No. 355,341 filed January 31, 1920.

In the accompanying drawings several adaptations and embodiments of the invention are diagrammatically shown, but it is to be understood that these are merely for the purpose of illustration and that many other embodiments and adaptations may be made and will readily occur to those skilled in the art.

In the drawings:

Figure 1 illustrates one form of an electroionic valve for providing the augmented relay effects with direct current;

Fig. 2 shows curves illustrating the performance of such a valve;

Fig. 3 is an electroionic valve of modified construction for providing a greater range of control;

Fig. 4 is an electroionic valve adapted for use with alternating current;

Fig. 5 is a modified electroionic valve for providing a greater range of control with alternating current, and Figs. 6 and 7 show control and regulating systems illustrating a field of application of the electroionic valves.

Fig. 1 will first be described. The electroionic valve comprises a vessel 1 which may be evacuated to the desired degree or filled with a gas; as for example, mercury vapor or argon. Within vessel 1 are arranged a main anode 2 and a cathode 3. Cathode 3 is heated to a glowing condition by current from a suitable source such as a battery 4, which is connected to its opposite terminals. The anode 2 is connected to a terminal A and one end of cathode 3 is connected to a terminal B. Terminals A and B are for connection to the device or circuit to be regulated or controlled, as will be hereinafter described.

Positioned between anode 2 and cathode 3 is an auxiliary anode 5 which may take the form of a grid. Grid 5 is connected to the negative terminal of a battery 6, the opposite terminal of which is connected to an auxiliary electrode 7 which is located in the vessel near the end opposite the main anode 2. A second auxiliary anode 8, which may also take the form of a grid, is positioned between electrode 7 and cathode 3.

The ends of cathode 3 and grid 8 are connected respectively to a pair of terminals C and D, which are adapted to be connected to the control circuit or, as it may be termed, the sensitive circuit of the complete system, as will be presently described.

The heated cathode 3 emits electrons which pass to anodes 2 and 7. If the vessel is evacuated to extreme limits only these electrons emitted by the cathode are present. These electrons are more crowded around the cathode forming space charges which influence the flow of electrons. The flow of electrons, and consequently the discharges between the cathode and the anodes, may be controlled by the grid potentials which control these space charges. Thus grid 8 may directly control the discharge between cathode 3 and anode 7 and grid 5 may directly control the discharge between cathode 3 and anode 2. Since the charge effect of grid 5 is influenced by the discharge between cathode 3 and anode 7 the main discharge may be controlled by the effect of grid 8 which is under the influence of the sensitive circuit connected to terminals C and D. Consequently the circuit to be controlled which is connected to terminals A and B is under the influence of the sensitive circuit connected to terminals C and D.

Since electrons pass from cathode 3 to anode 7, this discharge can be controlled by either positive or negative potentials on grid 8. However, since there can be no flow of electrons from anode 7 to cathode 3 the main discharge between cathode 3 and anode 2 can be controlled only by negative potentials on grid 5.

Positive potentials on grid 8 tend to decrease the space charge about cathode 3, particularly in the direction of the grid, and thus increase the discharge between cathode 3 and anode 7. On the other hand, negative potentials on grid 8 tend to increase the space charge about cathode 3, particularly in the direction of the grid, and consequently decrease the discharge between cathode 3 and anode 7. The discharge between cathode 3 and anode 7 produces a corresponding current from anode 7 to grid 5 which tends to produce and maintain a charge on grid 5. This charge determines the space charge or crowding tendency of the electrons between grid 5 and cathode 3 and therefore controls the main discharge between cathode 3 and anode 2.

When grid 5 is once charged very little current is required to maintain the charge. The necessity for any continuous current at all arises from the fact that, even with very small traces of gas in the vessel, a state of ionization exists between electrodes 3 and 5 wherein the positive ions have a neutralizing effect on the electronic charge at grid 5. With an absolute vacuum in the vessel, when grid 5 is once charged, there will be no further discharge between electrodes 5 and 3, since there well be no ionization, and consequently there will be no continuous flow of current between electrodes 3, 7 and 5 and only field influences without continuous current come into question. It has been experimentally observed that high relay ratios are obtained with very different low and high degrees of vacuum.

Changes in the voltage impressed upon the grid 8 through the sensitive circuit instantaneously and sharply influence the charges impressed upon grid 5 which, in turn, instantaneously and sharply influence the main discharge. The relay effect upon the main discharge is the product of the effects of the two grid systems upon the auxiliary and main discharges, or the product of the relay ratios of the discharges between the anodes 2 and 7 and cathode 3. Thus, for example, if one volt change of potential on grid 8 is equivalent to ten volts change in potential on grid 5 and one volt change in potential on grid 5 is equivalent to ten volts change between anode 2 and cathode 3 a change of one volt in the sensitive circuit will be equivalent to a variation of one hundred volts in the control circuit. The relay ratios between the two anodes 2 and 7 and cathode 3 depend upon the construction, composition and arrangement of the electrodes and the vessel and also the degree of evacuation, so that the ultimate relay ratio of the valves or the intensified self-magnifying thereof, may be varied as desired.

In case the vessel, instead of being merely evacuated, is filled with a gas such as mercury vapor or argon, there are, produced by the electric fields, in addition to the negative corpuscles or "electrons" as they are called, positive ions or vapor atoms, which have lost one or more electrons. These ions flow toward the hot cathode and neutralize or decrease the space charges of electrons in the vessel to affect the regulation of the discharges. With negative grid potentials these ions also flow to some extent to grid 5 and thus there are continuous currents between anode 7 and grid 5. While these currents are extremely small they nevertheless exist.

If the ultimate relay ratio of the valve is not always required or desired, lower ratios or different degrees of sensitiveness may be obtained from it by providing additional terminals such as C'—D' for connection to the sensitive circuit, or one side of the sensitive circuit may be connected to terminal C and the other side to a terminal D'' by moving a switch 9 to the dotted line position. With such arrangements only the usual relay action takes pace.

While in the foregoing description the cathode 3 has been described as being heated to a glowing condition, I have also found by experiment that when some oxides, such for example as cerium, yttrium and thorium oxids, are used to form the cathode a limited molecular heating appears to be sufficient to free enough electrons to bring about the desired results.

A valve of this character has the advantage of requiring only one heated cathode to provide a self-intensifying or cascade relay ratio effect. Also, since the currents flowing in the circuits including electrodes 7 and 8 are extremely small, or practically zero, the size of these electrodes may be comparatively small and that portion of the vessel containing them may be reduced in size as shown. The control and regulating effects being exercised by extremely small currents or merely through changes in electric charges there is no appreciable retarding effect due to the presence of magnetic induction in the sensitive circuit or of the discharge valve. By providing the valve with the auxiliary terminals various relay ratios or degrees of sensitiveness may be obtained from one vessel.

Fig. 2 illustrates graphically the effect produced by a valve such as previously described. The ordinates of the curves represent the main current and the abscissæ represent the voltages between the various electrodes. Thus the abscissæ of curve *a* are the voltages between terminals C and D of the sensitive circuit; the abscissæ of curve *b* are the voltages between grid 5 and anode 7 and the abscissæ of curve *c* are the voltages between cathode 3 and grid 5.

Fig. 3 shows a modified construction of the electroionic valve wherein either positive or negative potentials may be utilized to influence the action of the main discharge control electrode and thus the range of the valve may be increased. An evacuated or gas filled vessel 10 is provided with a main anode 11 and a main cathode 12, connected respectively to terminals A and B. Cathode 12 is heated by a suitable source of current such as a battery 13. An auxiliary anode 14, which may take the form of a grid, is positioned between the main electrodes to control the discharge therebetween. Grid 14 is connected by a suitable switch 15 to a battery 16. Switch 15 is for the purpose of reversing the battery connections to the grid so that either negative or positive potentials may be impressed thereon. Within vessel 10 at the end opposite anode 11 is an auxiliary cathode 17, heated by current as from a battery 18. A second anode 19, which may also be in the form of a grid, is located between cathodes 12 and 17. One side of cathode 17 is connected to battery 16 through a switch 20 and the other side is connected to a fixed contact of a switch 21. The other fixed contact of switch 21 is connected to cathode 12 and the movable contact is connected to terminal C. Grid 19 is connected to a terminal D. The terminals A and B are for connection to the control circuit and terminals C and D are for connection to the controlling or sensitive circuit of the system.

The main discharge between anode 11 and cathode 12 is under the immediate control of grid 14. The influence of grid 14 upon the main discharge is controlled by the current flowing thereto from cathode 17. Such a current is always possible because electrons are emitted from the heated cathode 17 and pass upward into the vessel. This stream of electrons is under the control of grid 19. Thus the main discharge is under the control of the sensitive circuit and the influence therebetween is the product of two relay ratios.

The space charge about auxiliary cathode 17 is increased or decreased by the action of grid 19 and this controls the discharge between cathode 17 and grid 14. The operating condition of grid 14, or the space charge condition below it, is influenced by this discharge and controls the main discharge between cathode 12 and anode 11. The control exerted by grid 19 may be by either positive or negative potentials when switch 21 is in the full line position, since the grid potentials may either increase or decrease the space charge about cathode 17 and thus either hinder or promote the discharge between cathode 17 and grid 14. Likewise the control exerted by grid 14, since this grid is connected to a cathode, may be by either positive or negative potentials. Grid 14 may thus either increase or decrease the space charge about cathode 12 and consequently either hinder or promote the main discharge between cathode 12 and anode 11. With switch 21 moved to the dotted line position the sensitive circuit is associated with cathode 3 somewhat as shown in Fig. 1.

Electrode 17 may thus act as a cathode or an anode so that grid 14 may affect the main discharge either through positive or negative potentials. The switch is not absolutely necessary since a suitable sphere of sensitiveness may be obtained in every case with sufficient changes of voltage between electrodes 17 and 19.

Fig. 4 shows a valve for providing the augmented or self intensifying relay effect to a direct current system from an alternating current source.

An evacuated or gas filled vessel 25 is provided with a main cathode 26 heated from a suitable source of current 27. Associated with cathode 26 and located on opposite sides thereof are a pair of main anodes 28 and 29 which coöperate with the cathode to rectify the alternating current from the line 30.

Electrodes 28 and 29 are connected to the opposite ends of the secondary winding of a transformer 31, the middle point of which is connected to a terminal A. The middle of cathode 26 is connected to a terminal B. Terminals A and B are for connection to the circuit or apparatus to be controlled as before.

Between anodes 28 and 29 and cathode 26 are located respectively auxiliary anodes 32 and 33, which may be in the form of grids. These grids control directly the main discharges and are themselves influenced by the discharges through an auxiliary electrode 34. Electrode 34 is located in a branch of vessel 25 and is connected in parallel to grids 32 and 33 through a battery 35. The negative side of battery 35 is connected to the grids. Between anode 34 and cathode 26 is an auxiliary electrode 36 which may also take the form of a grid. A pair of terminals C and D for connection to the controlling or sensitive circuit are connected to cathode 26 and grid 36.

The alternate half-waves of the alternating current induced from the line by transformer 31 are rectified by the action of anodes 28 and 29, respectively, and cathode 26. These rectified current pulsations are under the influence of grids 32 and 33, respectively. The charge on these grids is controlled by the discharges between cathode 26 and anode 34 which, in turn, are under the control of grid 36. The main discharges are thus under the control of the sensitive circuit connected to terminals C and D.

The relay action of this valve upon each wave of the alternating current is the same as that previously described in connection with Fig. 1.

Fig. 5 shows a modified valve of the same general character as that shown in Fig. 3, but adapted for use with an alternating current source.

Vessel 38 is provided with two main anodes 39 and 40 between which is located a main cathode 41. Cathode 41 is heated by current from a suitable source, such as a battery 42. Anodes 39 and 40 are connected to the opposite terminals of the secondary winding of transformer 43. The primary winding of transformer 43 is connected to a suitable alternating current source of supply and the middle of its secondary is connected to a terminal A. The middle of cathode 41 is connected to a terminal B. As pointed out for the preceding devices, terminals A and B are for connection to the circuit or apparatus to be controlled. Between cathode 41 and anodes 39 and 40 are positioned auxiliary electrodes 44 and 45, respectively. These electrodes may take the form of grids. In a branch of vessel 38 is located an auxiliary cathode 46, heated by a battery 47, and an auxiliary electrode 48. Electrode 48 may also take the form of a grid. A terminal C may be connected through a switch 49 either with main cathode 41 or auxiliary cathode 46 and a terminal D is connected to auxiliary grid 48. Terminals C and D are for connection to the controlling or sensitive circuit. Grids 44 and 45 are connected in parallel to one side of cathode 46.

The alternate waves of the alternating current induced by transformer 43 are rectified by the two main discharges between anodes 39 and 40, respectively, and cathode 41. These main discharges are under the control of grids 44 and 45, respectively, which are under the influence of the auxiliary discharges controlled by grid 48. These auxiliary discharges are, in turn, controlled by the sensitive circuit. This valve for each half-wave of the alternating current operates in the manner hereinbefore described in connection with Fig. 3.

It will be noted that with the electroionic valves shown in Figs. 3 and 5 the control circuit and the sensitive circuit may be completely separated, having no point of physical connection. Also, in all of the valves, the circuit including the grid directly controlling the main discharge is more protected from the high voltage because there is no physical connection between this grid and the main circuit. Thus the circuits carrying the high voltage and larger currents may be effectively separated from the low voltage sensitive circuit carrying the small or practically no current.

Fig. 6 shows a direct current motor system which, combined with any of the foregoing valves, forms a complete controlling and regulating system. This figure shows a direct current motor whose armature current is controlled by an intensification self-magnifying, electroionic valve such as already described.

The motor has an armature 55 whose brushes are connected to a pair of terminals A and B through a suitable source of power, such as a battery 56. Terminals A and B are adapted to be connected to the corresponding terminals of any of the foregoing valves. The motor is provided with an adjustably self-excited field 57. Connected to the motor shaft to be driven thereby, and thus to simulate the operation thereof, is a small direct current generator or tachometer machine 58. The tachometer has an adjustable, separately-excited field 59. One brush of the tachometer machine is connected to a terminal C in series with a battery 60, while the other brush of the tachometer is connected to a terminal D. Terminals C and D are adapted to be connected to the like designated terminals of the valves shown in Figs. 1, 3, 4 or 5.

The tachometer machine, being driven as it is directly by the shaft of the machine to be controlled and having no motion of its own, injects into the system no mechanical inertia affecting the regulation and control. The currents necessary to create the required grid potentials are extremely small, in fact if negative grid potentials are employed, no actual flow of current may be required. Consequently, the induction of the tachometer machine windings is practically or absolutely *nil*.

Variations in motor speed brought about by changes in the voltage of its source of power, load, etc., immediately varies the difference in voltage between battery 60 and tachometer 58, which varies the voltage impressed upon the sensitive circuit of the electroionic valve connected to terminals C and D. Through the train of influences within the valve the main discharge is practically simultaneously varied in an amount corresponding to the ultimate relay ratio or self-intensification magnifying effect of the valve. The main discharge controls the current through the motor armature so that speed variations thereof are automatically corrected.

Fig. 7 shows a direct current motor control system wherein the field excitation may be controlled by any of the valves hereinbefore described.

The motor has an armature 62 connected through an adjustable resistance 63 to a direct current source of power 64. The motor has a main field 65 which may be connected in the usual manner across the line and an auxiliary field 66. The terminals of the auxiliary field are connected to a pair of terminals A and B adapted to be connected to correspondingly designated terminals of any of the electroionic valves shown. Connected to the shaft of the motor is a small direct current generator or tachometer machine 67 provided with an adjustable separately excited field 68. The armature terminals of the tachometer are connected to a pair of terminals C and D through a suitable battery 69. Terminals C and D, forming the terminals of the sensitive circuit of the system, are adapted to be connected to similarly designated terminals of any of the previously described electroionic valves.

Changes in motor speed brought about by changes in line voltage, load, etc., instantaneously produce changes in the tachometer voltage which immediately varies the charge of the grid connected to the sensitive circuit. These variations in the charge of the grip connected to the sensitive circuit simultaneously produce changes in the main discharge which varies the current through the auxiliary field winding of the motor. The variations in current through the motor field winding vary the excitation thereof and consequently the speed of the motor. Thus speed variations are automatically and practically simultaneously corrected.

The operating conditions of the motor may be readily controlled by varying the excitation of the tachometer.

What I claim is:

1. A controlling and regulating system comprising a machine to be controlled; a main controlling circuit therefor; a sensitive circuit under the influence of said machine; and an electroionic valve having a main discharge path in said main controlling circuit, an auxiliary discharge in the sensitive circuit, and a second auxiliary discharge controlled by the first auxiliary discharge and controlling the main discharge in accordance with variations of potential in the sensitive circuit, brought about by variations in the operation of the machine.

2. A controlling and regulating system comprising a machine to be controlled; a main controlling circuit therefor; a sensitive circuit under the influence of said machine; and a single electroionic valve having a main discharge and two auxiliary discharges, said main discharge being in the main controlling circuit and being controlled cumulatively by the auxiliary discharges, one of said auxiliary discharges being under the control of the sensitive circuit.

3. A regulating system for automatically controlling a dynamo electric machine for variations in load, voltage, etc., comprising a sensitive circuit under the influence of the machine to be controlled; a main controlling circuit influencing the operation of the machine; and a single electroionic valve having a main discharge in the main controlling circuit, an auxiliary discharge in the sensitive circuit, and a second auxiliary discharge controlled by the first auxiliary discharge and acting cumulatively therewith upon the main discharge to produce a magnified self-intensifying, corrective effect upon the machine to be controlled.

4. A regulating system comprising a dynamo electric machine to be regulated for variations in load, line voltage, etc.; a sensitive circuit controlled thereby; a main controlling circuit acting upon said machine; and an electroionic valve having a pair of main electrodes in the main controlling circuit, an electrode in the sensitive circuit, and an auxiliary electrode whose condition is controlled by the electrode in the sensitive circuit for controlling the discharge between the main electrodes.

5. A regulating system for dynamo electric machines, having a sensitive circuit influenced by a machine to be controlled, a main controlling circuit for the machine, an electroionic valve, and an auxiliary circuit coöperating with the electroionic valve to inter-link the sensitive and main circuits whereby variations originating in the sensitive circuit are reproduced in the main circuit in magnified form.

In witness whereof I have hereunto subscribed my name.

Dr. FRIEDRICH WILHELM MEYER.